United States Patent
Patel et al.

(10) Patent No.: US 12,399,839 B1
(45) Date of Patent: Aug. 26, 2025

(54) DYNAMICALLY CONTROLLED CACHE RINSING

(71) Applicant: Advanced Micro Devices, Inc., Santa Clara, CA (US)

(72) Inventors: Chintan S. Patel, Austin, TX (US); Alexander J. Branover, Boxborough, MA (US); Joe J. Sargunaraj, Santa Clara, CA (US); Ganesh Balakrishnan, Austin, TX (US); Christopher J. Brennan, Boxborough, MA (US); Akshay Lahiry, Boxborough, MA (US); Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 25 days.

(21) Appl. No.: 18/090,257

(22) Filed: Dec. 28, 2022

(51) Int. Cl.
*G06F 12/12* (2016.01)
*G06F 12/0891* (2016.01)
*G06F 12/123* (2016.01)
*G06F 12/128* (2016.01)

(52) U.S. Cl.
CPC ........ *G06F 12/128* (2013.01); *G06F 12/0891* (2013.01); *G06F 12/123* (2013.01)

(58) Field of Classification Search
CPC ...... G06F 12/12; G06F 12/123; G06F 12/128; G06F 12/08; G06F 12/0891; G06F 12/00
See application file for complete search history.

(56) References Cited

U.S. PATENT DOCUMENTS

| | | | | |
|---|---|---|---|---|
| 6,625,694 B2 * | 9/2003 | Masri | ........... | G06F 12/121 |
| | | | | 711/E12.07 |
| 8,868,838 B1 * | 10/2014 | Glasco | ........... | G06F 12/126 |
| | | | | 711/133 |
| 10,681,394 B2 * | 6/2020 | Field | ........... | H04N 21/231 |
| 2008/0244185 A1 * | 10/2008 | O'Krafka | ........... | G06F 12/128 |
| | | | | 711/E12.075 |
| 2010/0274971 A1 * | 10/2010 | Solihin | ........... | G06F 12/0831 |
| | | | | 711/146 |
| 2015/0143059 A1 * | 5/2015 | Goodman | ........... | G06F 12/0864 |
| | | | | 711/143 |

(Continued)

FOREIGN PATENT DOCUMENTS

WO WO-2017142562 A1 * 8/2017 ............. G06F 11/30

OTHER PUBLICATIONS

J. Sim, G. H. Loh, H. Kim, M. OConnor and M. Thottethodi, "A Mostly-Clean DRAM Cache for Effective Hit Speculation and Self-Balancing Dispatch," 2012 45th Annual IEEE/ACM International Symposium on Microarchitecture, Vancouver, BC, Canada, 2012, pp. 247-257.*

(Continued)

*Primary Examiner* — Pierre Michel Bataille
(74) *Attorney, Agent, or Firm* — Greenberg Traurig, LLP (57) ABSTRACT

The disclosed computer-implemented method includes detecting a low utilization time period for memory traffic between a cache and memory, selecting from the cache, in response to detecting the low utilization time period, a dirty cache entry based on one or more factors, and writing the dirty cache entry back to the memory during the low utilization time period. Various other methods, systems, and computer-readable media are also disclosed.

20 Claims, 4 Drawing Sheets

(56) References Cited

U.S. PATENT DOCUMENTS

| | | | |
|---|---|---|---|
| 2016/0203085 A1* | 7/2016 | Kranich | G06F 12/0238 |
| | | | 711/120 |
| 2018/0285268 A1* | 10/2018 | Korgaonkar | G06F 13/4027 |
| 2018/0322052 A1* | 11/2018 | Benedict | G06F 11/3423 |
| 2023/0014565 A1* | 1/2023 | Ray | G06F 12/0811 |
| 2024/0143502 A1* | 5/2024 | Dechene | G06F 9/3836 |

OTHER PUBLICATIONS

S. Agarwal and H. K. Kapoor, "Reuse-Distance-Aware Write-Intensity Prediction of Dataless Entries for Energy-Efficient Hybrid Caches," in IEEE Transactions on Very Large Scale Integration (VLSI) Systems, vol. 26, No. 10, pp. 1881-1894, Oct. 2018.*

Y. Lee and S. Kim, "RAMS: DRAM Rank-Aware Memory Scheduling for Energy Saving," in IEEE Transactions on Computers, vol. 65, No. 10, pp. 3210-3216, Oct. 1, 2016.*

* cited by examiner

DYNAMICALLY CONTROLLED CACHE RINSING

BACKGROUND

Reducing memory accesses by a processor often improves performance by reducing overhead associated with memory accesses. Processors often include local memory or caches for storing data that is frequently accessed to avoid accessing the memory. Because the processors operate on the cached data, the memory needs to be updated with any changed (e.g., dirty) data in the cache. Cache rinsing involves writing dirty cache entries or lines back to memory before the cache entries are evicted for new entries. Because cache rinsing involves writing to memory, cache rinsing can reduce available memory bandwidth particularly if performed at inopportune times. For example, if the cache rinsing is triggered as part of an eviction for a cache miss, the cache rinsing adds significant overhead to the cache miss.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to dynamically controlled cache rinsing. As will be explained in greater detail below, implementations of the present disclosure opportunistically perform cache rinsing by writing dirty cache entries from a cache back to memory during a low utilization time period between the cache and the memory. The systems and methods provided herein improve the functioning of a computer itself by more efficiently utilizing memory bandwidth and more effectively updating memory coherency, further improving cache performance.

As will be described in greater detail below, the instant disclosure describes various systems and methods for dynamically controlling cache rinsing by detecting an opportunistic time for cache rinsing, selecting dirty cache entries with reduced overhead, and writing back the dirty cache entries.

In one example, a device for dynamically controlled cache rinsing includes a cache and a controller configured to: (1) detect a low utilization time period for memory traffic between a cache and memory, (2) select from the cache, in response to detecting the low utilization time period, a dirty cache entry based on one or more factors, and (3) write the dirty cache entry back to the memory during the low utilization time period.

In some examples, the one or more factors includes an age of the dirty cache entry. In some examples, selecting the dirty cache entry based on the age prioritizes an older entry.

In some examples, the one or more factors includes a dirtiness of a cache set for the dirty cache entry. In some examples, the dirtiness of the cache set corresponds to a number of dirty cache entries exceeding a threshold number of dirty cache entries. In some examples, selecting the dirty cache entry based on the dirtiness prioritizes a cache set with a larger percentage of dirty cache entries. In some examples, the dirtiness of the cache set corresponds to a number of dirty cache entries exceeding a threshold number of dirty cache entries near eviction and selecting the dirty cache entry based on the dirtiness prioritizes a cache set with a larger number of dirty cache entries near eviction.

In some examples, the one or more factors includes random selection. In some examples, detecting the low utilization time period is asynchronous from a memory request for the cache. In some examples, the method further includes periodically observing the memory traffic between the cache and the memory, wherein detecting the low utilization time period occurs during the periodic observation. In some examples, the low utilization time period corresponds to a number of active operations between the cache to the memory being less than a threshold number of operations.

In one implementation, a system for dynamically controlled cache rinsing includes a physical memory, a cache corresponding to the physical memory, and a controller configured to observe, asynchronously from a memory request for the cache, a memory traffic between the cache and the memory, detect, during the observation, a low utilization time period for the memory traffic, select from the cache, in response to detecting the low utilization time period, a dirty cache entry based on one or more factors, and write the dirty cache entry back to the memory during the low utilization time period.

In some examples, the one or more factors includes an age of the dirty cache entry and selecting the dirty cache entry prioritizes an older entry. In some examples, the one or more factors includes a dirtiness of a cache set for the dirty cache entry that corresponds to a number of dirty cache entries exceeding a threshold number of dirty cache entries and selecting the dirty cache entry prioritizes a cache set with a larger percentage of dirty cache entries. In some examples, the one or more factors includes random selection.

In some examples, the low utilization time period corresponds to a number of active operations between the cache to the memory being less than a threshold number of operations.

In one implementation, a method for dynamically controlled cache rinsing includes (1) detecting a low utilization time period for a write traffic from the cache, (2) selecting from the cache, in response to detecting the low utilization time period, a dirty cache entry based on an age of the dirty cache entry, and (3) writing back the dirty cache entry during the low utilization time period.

In some examples, selecting the dirty cache entry prioritizes an older entry. In some examples, selecting the dirty cache entry is further based on a dirtiness of a cache set for the dirty cache entry, and the dirtiness of the dirty cache entry corresponds to a number of dirty cache entries exceeding a threshold number of dirty cache entries. In some examples, selecting the dirty cache entry prioritizes a cache set with a larger percentage of dirty cache entries.

In some examples, the method further includes periodically observing the write traffic from the cache. In some examples, detecting the low utilization time period occurs during the periodic observation. In some examples, detecting the low utilization time period is asynchronous from a memory request for the cache. In some examples, the low utilization time period corresponds to a number of active operations for the cache being less than a threshold number of operations.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-4, detailed descriptions of dynamically controlled cache rinsing. Detailed descriptions of example systems for dynamically controlled cache rinsing will be provided in connection with FIG. 1. Detailed descriptions of an example cache hierarchy will be provided in connection with FIG. 2. Detailed descriptions of exampling cache rinsing will be provided in connection with FIG. 3. Detailed descriptions of corresponding computer-implemented methods will also be provided in connection with FIG. 4.

Figure 1:
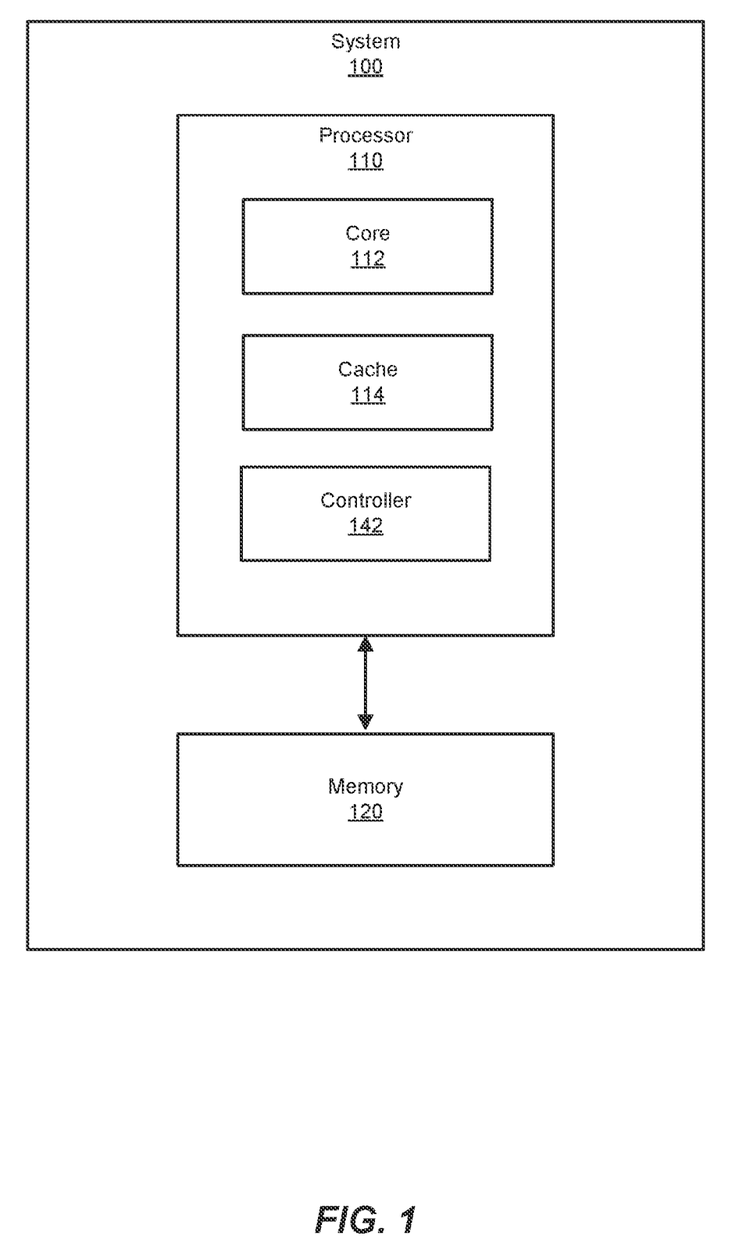
FIG. 1 is a block diagram of an exemplary system for dynamically controlled cache rinsing.

FIG. 1 is a block diagram of an example system 100 for dynamically controlled cache rinsing. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a core 112, a cache 114, and a controller 142. Core 112 corresponds to a processor core, although in other examples corresponds to a chiplet such as a chiplet of an accelerator, or any other processing unit, Cache 114 corresponds to a cache used by processor 110 (e.g., a client-side cache such as a low-level cache or L1 cache). In some examples, cache 114 corresponds to and/or includes other caches, such as a memory-side cache. Controller 142 corresponds to a control circuit that can manage cache 114, such as by performing cache rinsing. In some examples, controller 142 also controls aspects of cache 114.

Processor 110 reads and operates on instructions and/or data stored in memory 120. Because memory 120 is often slower than processor 110, memory access times create bottlenecks for processor 110. To alleviate this problem, processor 110 includes cache 114, which is typically a fast memory with access times less than that of memory 120, in part due to being physically located in processor 110.

Cache 114 holds data and/or instructions read from memory 120. Processor 110 (and/or core 112) first makes memory requests to cache 114. If cache 114 holds the requested data (e.g., a cache hit), processor 110 reads the data from cache 114 and avoids the memory access times of memory 120. If cache 114 does not hold the requested data (e.g., a cache miss), processor 110 retrieves the data from memory 120, incurring the memory access time. Although a larger cache size can reduce cache misses, considerations such as die size and power consumption limits the size of cache 114. Thus, to further reduce the need to access memory 120 on cache misses, processor 110 can incorporate another cache (e.g., one or more intervening levels of caches), that is larger but slower than cache 114, in a cache hierarchy.

As will be described further below, as processor 110 operates on data stored in cache 114, the modified or dirty data entries must be written back to memory 120 to maintain the coherency of memory 120. The dirty entries can be written back immediately prior to eviction (e.g., clearing of entries in cache 114 to make space for new entries), at the cost of adding overhead to the eviction. The cache rinsing described herein provides for an opportunistic approach.

Figure 2:
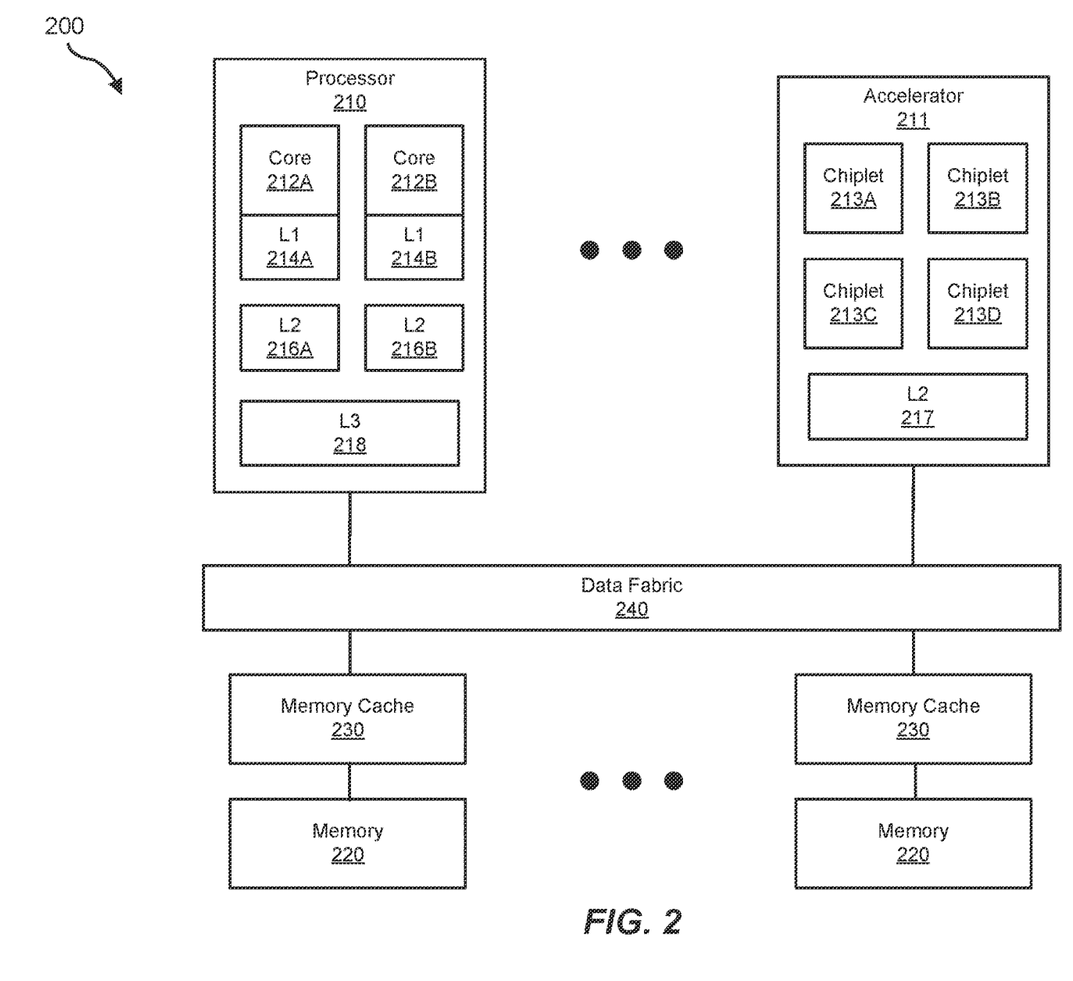
FIG. 2 is a block diagram of an example cache hierarchy.

FIG. 2 illustrates an example cache hierarchy in a system 200 which corresponds to system 100. System 200 includes one or more processors 210 which corresponds to processor 110 and one or more accelerators 211 which corresponds to processor 110. As illustrated in FIG. 2, processor 210 includes a core 212A which corresponds to core 112, a core 212B which corresponds to core 112, an L1 cache 214A which corresponds to cache 114, an L1 cache 214B which corresponds to cache 114, an L2 cache 216A which can correspond to cache 114, an L2 cache 216B which can correspond to cache 114, and an L3 cache 218 which can correspond to cache 114.

In the cache hierarchy of FIG. 2, level 1 (L1) corresponds to a lowest level of the hierarchy. L1 caches, such as L1 cache 214A and L1 cache 214B, can be implemented with a fast memory, such as static random-access memory (SRAM). To further prioritize speed, L1 caches can also be integrated with processor 210, for example within core 212A and core 212B respectively, which can improve latency and throughput. In some examples, as shown in FIG. 2, processor 210 includes multiple L1 caches.

L2 caches, such as L2 cache 216A and L2 cache 216B, are the next level in the cache hierarchy after L1 caches, which can be larger than and slower than L1 caches. Although integrated with processor 210, L2 caches can, in some examples, be located outside of a chip core, but can also be located on the same chip core package. L3 caches such as L3 cache 218 can be larger than L2 caches but can also be slower. In some examples, L3 caches can serve as a bridge to the main memory (e.g., memory 220). As such, L3 caches can be faster than the main memory. In some examples, multiple processors and/or cores can share an L3 cache, which can be located on the same chip core package or outside the package.

Memory 220 which corresponds to memory 120, stores instructions and/or data for processor 210 to read and use. Memory 220 can be implemented with dynamic random-access memory (DRAM). As shown in FIG. 2, the cache hierarchy further includes a memory cache 230 (e.g., a memory-side cache) which in some examples corresponds to cache 114, and a data fabric 240 which corresponds to various structures, connections, and control circuits for sending data between memory and cache structures.

System 200 also includes one or more accelerators having a similar cache hierarchy. Accelerator 211 includes a chiplet 213A which corresponds to core 112, a chiplet 213B which corresponds to core 112, a chiplet 213C which corresponds to core 112, a chiplet 213D which corresponds to core 112, and an L2 cache 217 which corresponds to cache 114 that is shared by the chiplets.

Available bandwidth between the caches and the memory reduces as the memory traffic between the caches and the memory increases. For example, as cache misses occur (e.g., requested data not in cache), the caches must fetch the requested data from the memory, reducing the bandwidth. If an eviction is needed to fetch the requested data, and there is dirty data to be written back to the memory, the write back also reduces the bandwidth. As will be described further below, the caches can update the respective memories via cache rinsing to reduce the write backs.

Figure 3:
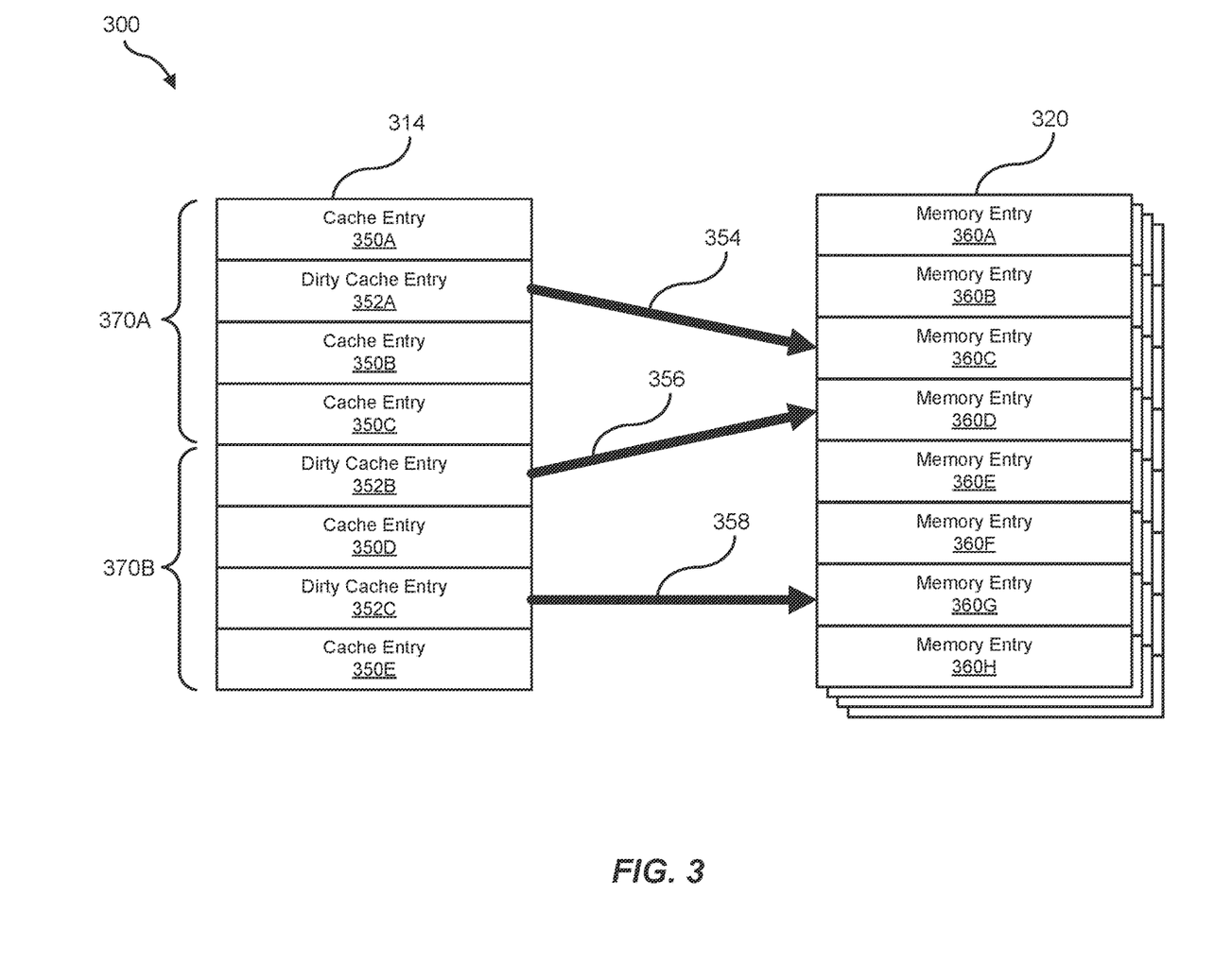
FIG. 3 is a diagram of an exemplary cache rinsing.

FIG. 3 illustrates a system 300 corresponding to system 100. System 300 includes a cache 314 corresponding to cache 114 and a memory 320 corresponding to memory 120. As further illustrated in FIG. 3, cache 314 includes various lines or entries for holding data, such as a cache entry 350A, a cache entry 350B, a cache entry 350C, a cache entry 350D, a cache entry 350E, a dirty cache entry 352A, a dirty cache entry 352B, and a dirty cache entry 352C. In some examples, the cache entries correspond to lines. The cache entries can be organized into sets, such as cache entry 350A, dirty cache entry 352A, cache entry 350B, and cache entry 350C being in cache set 370A, and dirty cache entry 352B, cache entry 350D, dirty cache entry 352C, and cache entry 350E being in cache set 370B. In some examples, the cache sets correspond to pages. Memory 320 includes various lines or entries as well (e.g., addresses), such as a memory entry 360A, a memory entry 360B, a memory entry 360C, a memory entry 360D, a memory entry 360E, a memory entry 360F, a memory entry 360G, a memory entry 360H, etc.

Dirty cache entries, such as dirty cache entry 352A, dirty cache entry 352B, and/or dirty cache entry 352C, correspond to data that has been modified (e.g., written to) since being read from memory 320. In some examples, cache 314 and/or a controller thereof (e.g., controller 142) tracks whether entries are dirty, for instance by storing metadata of cache entry properties. During an eviction 354, the controller can select dirty cache entry 352A according to an appropriate eviction policy (e.g., selecting a page or cache set 370A including dirty cache entry 352A for eviction). The controller can load the metadata for dirty cache entry 352A to determine whether dirty cache entry 352A should be written back to memory 320 (e.g. to its corresponding address at memory entry 360C) before deleting from cache 314.

In some examples, performing the write back to memory during eviction 354 can add overhead to a memory request that triggered eviction 354. For instance, the controller loads the metadata in an operation having overhead, and writing data back to memory 320 consumes bandwidth. To mitigate such overhead, cache rinsing can occur before eviction.

Rinse 356 occurs prior to dirty cache entry 352B being selected for eviction. For instance, rather than waiting for an eviction involving dirty cache entry 352B to write back the dirty data to memory entry 360D, the controller can proactively (e.g., asynchronously from an eviction and/or memory request) write back or rinse the dirty data. In some implementations, the controller can wait for or detect when bandwidth is available. For example, the controller can periodically check whether the available bandwidth is above a bandwidth threshold, which can correspond to a low utilization time period of memory traffic. In some examples, the low utilization time period corresponds to a number of active and/or pending memory requests between cache 314 and memory 320 (e.g., read and/or write requests) are below a threshold number of memory requests. In some examples, the low utilization time period corresponds to the number of active and/or pending memory requests being within a threshold range for a threshold period of time (e.g., number of cycles). In some implementations, the controller can actively detect when there is a low utilization time period. Thus, when the controller detects sufficient available bandwidth, the controller can perform rinse 356. Further, in some implementations, rinse 356 includes rinsing all cache entries of the respective cache set (e.g., rinsing dirty cache entry 352B includes also rinsing cache entry 350D, dirty cache entry 350C, and cache entry 350E).

In some implementations, the controller selects between candidate dirty cache entries based on one or more factors. For example, the controller can select dirty cache entry 352C before dirty cache entry 352B to perform a rinse 358 (of writing the data from dirty cache entry 352C back to memory entry 360G) before rinse 356. Some of the factors include dirtiness (e.g., an amount of dirty data) and age (e.g., how long data has been in cache 314).

In some examples, dirtiness can be considered as whether a cache set is dirty (e.g., has dirty data), has a sufficient amount of dirty data (e.g., having a number of dirty cache lines exceeding a threshold number of dirty cache lines), or compared between cache sets. In some examples, dirtiness can correspond to a number of non-dirty cache entries in the respective cache set, which can correspond to a number of non-dirty cache entries that will be evicted. In some examples, the dirtiness can correspond to a number of non-evicting cache entries (e.g., cache entries that are not dirty or cache entries that are not within N, a threshold number of misses, away from eviction) that will be evicted.

In some examples, age can be considered based on how long the data has been in cache 314, or how long since the data was last used (e.g., tracked as least recently used (LRU)). In some examples, age can correspond to an eviction age, such as a maximum or minimum time to live. In other examples, age can correspond to a number of misses.

In some implementations, the controller can select the best dirty cache entry candidate for rinsing first. For instance, a dirtier cache set (e.g., having a larger number and/or percentage of dirty cache lines) can be prioritized first, and older entries can be prioritized second. For example, in FIG. 3, cache set 370B can be selected over cache set 370A based on dirtiness (e.g., cache set 370B has more dirty cache entries and/or a higher percentage of dirty cache entries than cache set 370A, or cache set 370B has fewer non-dirty cache entries than cache set 370A). From the selected cache set, the oldest dirty cache entry can be selected. Thus, the dirtiest, oldest cache entry can be selected. However, in some examples, reading the relevant metadata and comparing candidates can introduce undesirable overhead. For example, determining the dirtiness can require fetching metadata. As such, in other implementations, the controller can rely on more easily accessible (e.g., quickly fetchable) factors.

In some implementations, the controller can more readily determine age than dirtiness. For instance, the controller can more quickly read LRU metadata than dirtiness metadata. Thus, the controller can select a dirty cache entry based on age. In some examples, the controller can rely on other factors, such as to select between similarly aged cache entries. In some examples, the controller can randomly select between candidates. For instance, rather than fetching dirtiness metadata, the controller can more quickly randomly select between similarly aged cache entries.

In yet other implementations, the controller can rely on any combination and prioritization thereof of factors determined from the cache entry metadata. In some examples, the controller can select which factors to prioritize based on available bandwidth. For instance, when more bandwidth is available, the controller can prioritize selecting the best candidates even if the selection process incurs overhead. When less bandwidth is available, the controller can prioritize faster candidate selection.

Moreover, in some implementations, to avoid unneeded writing of data to memory 320, cache rinsing can be suppressed even if memory bandwidth is available. If the factors described herein do not produce a desirable candidate for rinsing, the controller can wait for the next low utilization time period. For example, if a number of dirty cache entries have not hit the threshold (e.g., within a cache set) a cache set may not be selected. In addition, after selecting a cache set if an age of a dirty cache entry is not close to an eviction age (e.g., does not satisfy an eviction age threshold), the controller can skip the dirty cache entry for rinsing. In another example, the controller can prioritize cache sets based on a number of non-dirty and/or non-evicting cache entries lines exceeding N misses away from eviction until no cache sets are above the threshold number of cache entries.

Figure 4:
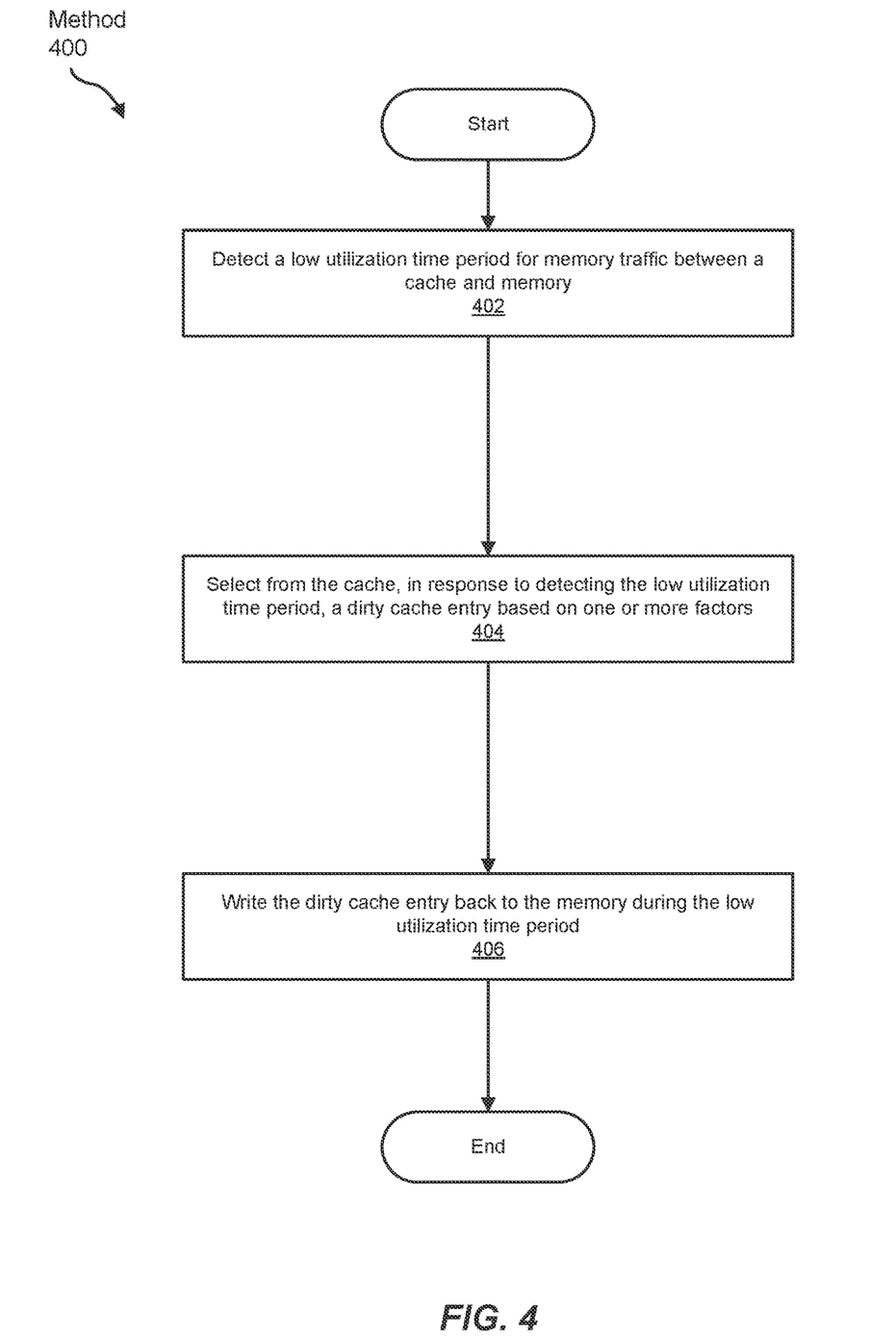
FIG. 4 is a flow diagram of an exemplary method for dynamically controlled cache rinsing.

FIG. 4 is a flow diagram of an exemplary computer-implemented method 400 for dynamically controlled cache rinsing. The steps shown in FIG. 4 can be performed by any suitable computer-executable code and/or computing system, including the system(s) illustrated in FIGS. 1 and/or 2. In one example, each of the steps shown in FIG. 4 represent an algorithm whose structure includes and/or is represented by multiple sub-steps, examples of which will be provided in greater detail below.

As illustrated in FIG. 4, at step 402 one or more of the systems described herein detect a low utilization time period for memory traffic between a cache and memory. For example, controller 142 can detect a low utilization time period for memory traffic between cache 114 and memory 120.

The systems described herein can perform step 402 in a variety of ways. In one example, detecting the low utilization time period is asynchronous from a memory request for the cache. Controller 142 can periodically wake up and observe the memory traffic between cache 114 and memory 120. In some examples, the low utilization time period corresponds to a number of active operations between cache 114 to memory 120 being less than a threshold number of operations. Controller 142 can detect the low utilization time period during the periodic observation.

At step 404 one or more of the systems described herein select from the cache, in response to detecting the low utilization time period, a dirty cache entry based on one or more factors. For example, controller 142 selects a dirty cache entry based on at least one factor.

The systems described herein can perform step 404 in a variety of ways. In one example, controller 142 can read metadata for cache entries for analyzing the factors. The one or more factors can include an age of the dirty cache entry such that selecting the dirty cache entry based on the age prioritizes an older entry.

The one or more factors can include a dirtiness of a cache set for the dirty cache entry such that selecting the dirty cache entry based on the dirtiness prioritizes a cache set with a larger percentage of dirty cache entries. In some examples, the dirtiness of the cache set corresponds to a number of dirty cache entries exceeding a threshold number of dirty cache entries. In some examples, the dirtiness of the cache set corresponds to a number of dirty cache entries exceeding a threshold number of dirty cache entries near eviction such that selecting the dirty cache entry based on the dirtiness prioritizes a cache set with a larger number of dirty cache entries near eviction. A dirty cache entry near eviction can correspond to a dirty cache entry closer than N (e.g., an eviction threshold) number of misses away from eviction. In some examples, the dirtiness of the cache set corresponds to a number of non-dirty cache entries and/or a number of non-evicting cache entries (e.g., non-dirty cache entries and dirty cache entries that are not near eviction).

The one or more factors can also include random selection (e.g., as a tiebreaker), such as random selection between cache entries similarly evaluated based on other factors.

At step 406 one or more of the systems described herein write the dirty cache entry back to the memory during the low utilization time period. For example, controller 142 can write the dirty data from the selected dirty cache entry back to memory 120 during the low utilization time period. Accordingly, controller 142 can opportunistically perform cache rinsing during times of available bandwidth between cache 114 and memory 120.

As detailed above, the systems and method described herein provide a dynamic technique for rinsing a cache. Cache rinsing is a technique in which cache lines are written back to memory opportunistically prior to an eviction occurring. During system operation, a cache controller searches for periods of time in which the cache is relatively underused. During these periods of time, the cache controller writes back the data in dirty lines to the memory. The cache controller selects cache lines according to a set of selection criteria to maximize impact. One such criterion is the number of dirty cache lines in a set. For any particular set, if the number of dirty cache lines is above a threshold, the cache controller selects the dirty lines of that set for write back.

For any particular cache, the bandwidth to the cache is determined by certain factors. If requested data is in the cache such that mostly hits occur, then the highest bandwidth is achieved. If requested data is not in the cache, then misses occur and the cache fetches the requested data from memory and the bandwidth is lowered. If misses occur and the cache includes dirty lines, then an even lower amount of bandwidth is achieved, since some of the bandwidth between the memory and the cache must be expended on performing write-backs.

The present disclosure provides for opportunistically checking for cache lines to rinse during operation. While the system is running, a processor accesses the cache. In certain periods of time, such as where the processor accesses data mostly already stored in its internal cache, the cache is accessed very lightly. While the cache is accessed lightly, bandwidth between the cache and memory exists. Thus, during these periods, a cache controller is able to rinse the cache. Rinsing the cache improves bandwidth during high utilization periods if the cache has a large number of dirty lines because evicting dirty lines requires writing the data in those dirty lines back to the memory, which consumes some bandwidth. By writing back dirty cache lines during low utilization periods, bandwidth is freed for use during high utilization periods. The dynamic cache rinsing described herein includes selecting cache lines for rinsing based on certain criteria, such as the percentage of cache lines in a set that are dirty.

The dynamic cache rinsing can improve cache performance by improving cache bandwidth during high utilization periods of time. More specifically, without dynamic cache rinsing as described herein, cache bandwidth can be greatly reduced during high utilization periods of time if a large number of write-backs to a backing memory occurs. Using the low utilization periods of time to perform such write-backs frees up bandwidth for other uses during the high utilization periods of time.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    detecting a low utilization time period for a write traffic from a cache;
    prioritizing one or more factors of a plurality of factors that includes at least one of an age of a dirty cache entry that prioritizes selecting an older entry, a dirtiness of a cache set of the cache, or a random selection based on an available bandwidth and an overhead associated with each of the plurality of factors;
    selecting from the cache set of the cache, in response to detecting the low utilization time period, the dirty cache entry based on the prioritized one or more factors; and
    writing back the dirty cache entry during the low utilization time period.

2. The method of claim 1, wherein the dirtiness of the cache set corresponds to a number of dirty cache entries exceeding a threshold number of dirty cache entries.

3. The method of claim 2, wherein selecting the dirty cache entry prioritizes a cache set with a larger percentage of dirty cache entries.

4. The method of claim 1, further comprising periodically observing the write traffic from the cache, wherein:
    detecting the low utilization time period occurs during the periodic observation;
    detecting the low utilization time period is asynchronous from a memory request for the cache; and
    the low utilization time period corresponds to a number of active operations for the cache being less than a threshold number of operations.

5. The method of claim 1, further comprising suppressing selection of the dirty cache entry when the cache set does not reach a threshold number of dirty cache entries or the age of the dirty cache entry does not satisfy an eviction age threshold.

6. The method of claim 1, the age of the dirty cache or the random selection is prioritized when less bandwidth is available, and the dirtiness is prioritized when more bandwidth is available.

7. A device comprising:
a cache; and
a controller configured to:
 detect a low utilization time period for memory traffic between a cache and memory;
 prioritize one or more factors of a plurality of factors that includes at least one of an age of a dirty cache entry that prioritizes selecting an older entry, a dirtiness of a cache set of the cache, or a random selection based on an available bandwidth and an overhead associated with each of the plurality of factors;
 select from the cache set of the cache, in response to detecting the low utilization time period, the dirty cache entry based on the prioritized one or more factors; and
 write the dirty cache entry back to the memory during the low utilization time period.

8. The device of claim 7 wherein the dirtiness of the cache set corresponds to a number of dirty cache entries exceeding a threshold number of dirty cache entries and selecting the dirty cache entry based on the dirtiness prioritizes a cache set with a larger percentage of dirty cache entries.

9. The device of claim 7 wherein the dirtiness of the cache set corresponds to a number of dirty cache entries exceeding a threshold number of dirty cache entries near eviction and selecting the dirty cache entry based on the dirtiness prioritizes a cache set with a larger number of dirty cache entries near eviction.

10. The device of claim 7, wherein detecting the low utilization time period is asynchronous from a memory request for the cache.

11. The device of claim 7, wherein the controller is configured to periodically observe the memory traffic between the cache and the memory, wherein detecting the low utilization time period occurs during the periodic observation.

12. The device of claim 7, wherein the low utilization time period corresponds to a number of active operations between the cache to the memory being less than a threshold number of operations.

13. The device of claim 7, wherein the controller is configured to suppress selecting the dirty cache entry when the cache set does not reach a threshold number of dirty cache entries.

14. The device of claim 7, wherein the controller is configured to suppress selecting the dirty cache entry when the age of the dirty cache entry does not satisfy an eviction age threshold.

15. The device of claim 7, wherein the controller is configured to prioritize the age of the dirty cache or the random selection when less bandwidth is available, and prioritize the dirtiness of the cache set when more bandwidth is available.

16. A system comprising:
a physical memory;
a cache corresponding to the physical memory; and
a controller configured to:
 observe, asynchronously from a memory request for the cache, a memory traffic between the cache and the memory;
 detect, during the observation, a low utilization time period for the memory traffic;
 prioritize one or more factors of a plurality of factors that includes at least one of an age of a dirty cache entry that prioritizes selecting an older entry, a dirtiness of a cache set of the cache, or a random selection based on an available bandwidth and an overhead associated with each of the plurality of factors;
 select from the cache set of the cache, in response to detecting the low utilization time period, the dirty cache entry based on the prioritized one or more factors; and
 write the dirty cache entry back to the memory during the low utilization time period.

17. The system of claim 16, wherein the dirtiness of the cache set corresponds to a number of dirty cache entries exceeding a threshold number of dirty cache entries and selecting the dirty cache entry prioritizes a cache set with a larger percentage of dirty cache entries.

18. The system of claim 16, wherein the low utilization time period corresponds to a number of active operations between the cache to the memory being less than a threshold number of operations.

19. The system of claim 16, wherein the controller is configured to suppress selecting the dirty cache entry when the cache set does not reach a threshold number of dirty cache entries or the age of the dirty cache entry does not satisfy an eviction age threshold.

20. The system of claim 16, wherein the controller is configured to prioritize the age of the dirty cache or the random selection when less bandwidth is available, and prioritize the dirtiness of the cache set when more bandwidth is available.

* * * * *